Oct. 3, 1967  H. L. MARTIN  3,345,561
MOUNT FOR SUPPORTING DUAL BOLOMETERS AT SAME TEMPERATURE
Filed Sept. 26, 1963

INVENTOR.
HOWARD L. MARTIN
BY
John H. Gallagher
ATTORNEY

Oct. 3, 1967    H. L. MARTIN    3,345,561
MOUNT FOR SUPPORTING DUAL BOLOMETERS AT SAME TEMPERATURE
Filed Sept. 26, 1963    2 Sheets-Sheet 2
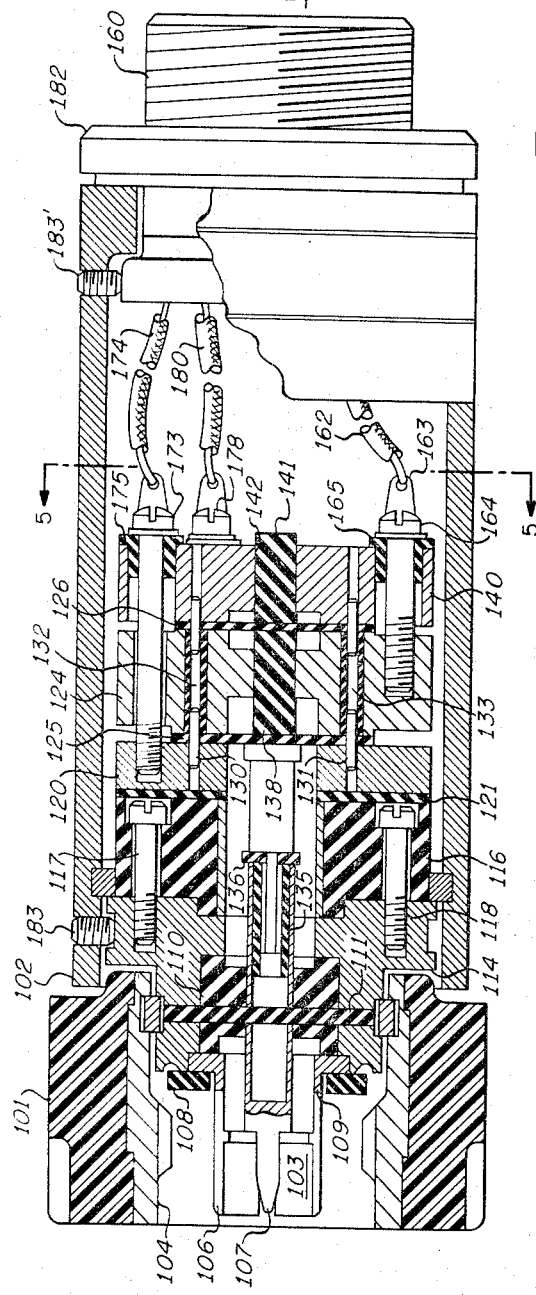
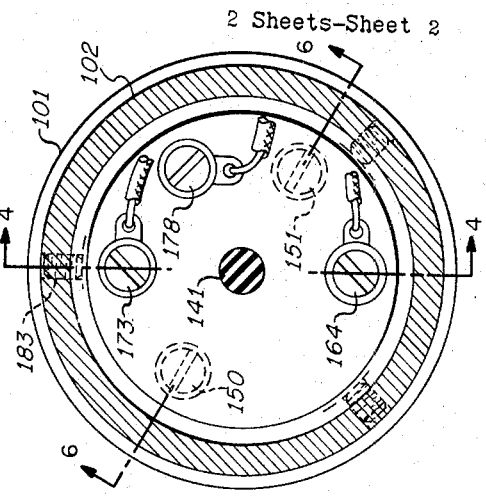
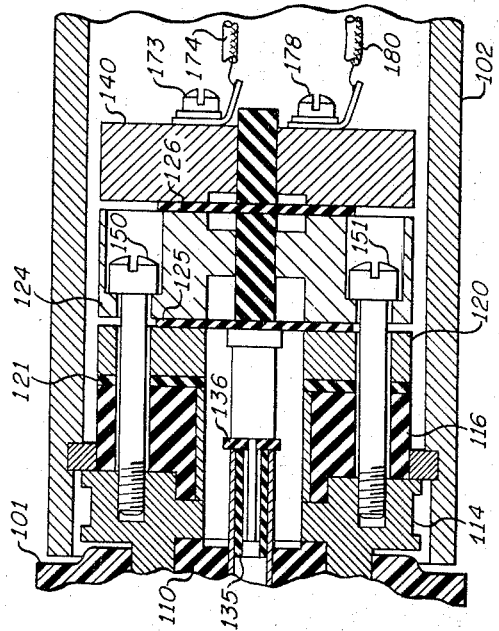
INVENTOR.
HOWARD L. MARTIN
BY
John H. Gallagher
ATTORNEY United States Patent Office 3,345,561
Patented Oct. 3, 1967

3,345,561
MOUNT FOR SUPPORTING DUAL BOLOMETERS AT SAME TEMPERATURE
Howard L. Martin, Safety Harbor, Fla., assignor to Sperry Rand Corporation, Great Neck, N.Y., a corporation of Delaware
Filed Sept. 26, 1963, Ser. No. 311,690
8 Claims. (Cl. 324—95)

ABSTRACT OF THE DISCLOSURE

A mount equipped with a pair of identically thermally conductive members for detachably supporting a pair of bolometer elements with respect to an electromagnetic wave propagating structure. The thermally conductive members are thermally interconnected and symmetrically thermally connected to the electromagnetic wave propagating structure to minimize temperature difference between the two bolometers, one of which senses electromagnetic wave power only and the other of which senses ambient temperature only.

---

This invention relates to dual element bolometer mounts in which an electromagnetic wave power sensing bolometer and an ambient temperature sensing bolometer are thermally interconnected and so positioned and thermally coupled to the structure of the mount as to minimize temperature gradients between said bolometers, and thereby minimize the temperature drift of the zero adjustment of a meter in an electromagnetic energy power measuring bridge circuit.

Bolometer elements such as thermistor beads and barretter wires commonly are employed in electromagnetic wave transmission lines to make low and medium power measurements of electromagnetic waves in the upper ranges of the radio frequency spectrum. These bolometer elements have a resistance characteristic that changes with temperature, and when placed in the path of R.F. electromagnetic waves in a uniconductor waveguide or a coaxial transmission line, the elements absorb energy from the waves and convert it to heat, thus changing their resistance as a function of the power of the incident electromagnetic waves. The bolometer element is connected as an arm of an external bridge circuit, and the degree of unbalance of the bridge resulting from a change in resistance of the bolometer element, or the current increase or decrease necessary to maintain the bridge circuit in a balanced condition, is metered to give an indication of the power of the electromagnetic waves in the waveguide. The resistance of the bolometer element also is subject to change due to changes in the ambient temperature of its immediate environment. This together with other factors which are a function of temperature introduce errors into the meter reading and cause a zero off-set of the meter when it is properly zeroed in an environment of one temperature but is taken to a different temperature environment for use, or when the ambient temperature varies at a fixed location between the time that the bridge and meter circuit are calibrated and the time that they are used. In attempts to eliminate this temperature dependence of the meter zero adjustment, dual bolometer element circuits have been devised in which the second element senses only the ambient temperature and operates in the circuit in such a manner that its resistance change produces an opposite effect to that produced by the change in resistance due to change in ambient temperature at the power sensing bolometer. Dual element bolometer mounts that house both the power sensing and the ambient temperature sensing bolometers have been made for use in uniconductor waveguide and coaxial transmission lines. Early-developed dual element bolometer mounts were unsatisfactory for measurements of very low power levels in the range of a few microwatts, however, because unequal thermal coupling of the elements to the external environment, and/or poor thermal coupling between the elements themselves caused a meter deflection due to ambient temperature differences that was greater than the deflection caused by the absorption of very low power R.F. electromagnetic waves. This resulted in an anoying zero off-set that "swamped out" the smaller deflection caused by the very low power electromagnetic waves.

In known dual element bolometer mounts recently developed to overcome the above deficiencies, equal coupling of the two bolometer elements to the external environment has not always been successfully accomplished, and further, the bolometer elements have been constructed as an integral part of the mount, as by soldering them in place. Because of this latter feature, the required operating characteristics of the two bolometer elements in the circuit could not accurately be determined until the elements were soldered in position. As a result, the bolometer elements cannot readily be replaced by the user and the mount must be returned to the manufacturer for replacement of the bolometer elements and for correction of zero meter drift caused by differences between the two elements.

It therefore is an object of this invention to provide an improved dual element waveguide bolometer mount that provides efficient thermal coupling between the elements and further provides substantially equal thermal coupling of the two elements to the structure of the mount.

It is another object of this invention to provide an improved dual element bolometer mount that permits the replacement of elements by the user.

A further object of this invention is to provide an dual element bolometer mount having an improved parallel thermal conduction path between bolometer elements, and wherein substantially symmetrical thermal coupling is provided between each of the elements and the body structure of the mount, and thus to their ambient environment.

In accordance with one embodiment of the present invention, the substantial elimination of the zero drift on a meter of an electromagnetic wave power sensing bridge circuit is accomplished by the provision of a body member made of a high thermal conductivity material and having a uniconductor waveguide formed therein. A first electromagnetic wave power sensing bolometer element is positioned within the waveguide in the path of electromagnetic waves supported therein and out of direct thermal conductive contact with the body member. A second ambient temperature sensing bolometer element is positioned within the body member out of the path of the electromagnetic waves and out of direct thermal conductive contact with the body member. A first pair of substantially identical parallel apertures extend through one end of the body member transversely to the waveguide axis and in registration, respectively, with the two bolometer elements. A second pair of substantially identical parallel apertures extend through the other end of the body member transversely to the waveguide axis and respectively coaxial with the first pair of apertures. A center rod of a thermal and electrical conductive material is coaxially disposed within each of said apertures, each of the rods being of smaller diameter than its surrounding aperture, thereby to form a coaxial line section of waveguide. A first pair of the coaxially aligned rods is in direct thermal and electrical conductive contact with the electromagnetic wave power sensing bolometer element and the second pair of coaxially aligned rods is in direct thermal and electrical conductive contact with the ambient temperature sensing bolometer element. Means at each end of the body member provide a direct thermal conductive contact between the respective rods that extend through the respective ends of the body member, thereby thermally connecting together the two bolometer elements with conductive heat transfer paths. Means also are provided at each end of the body member for thermally conductively connecting the respective heat transfer paths to the body member, these last-named means being symmetrically located in said paths to assure substantial equal heat transfers between the body member and the respective bolometer elements. Equal transfer of heat between the body member and the bolometer elements via radiation is achieved by having substantially identical physical structures for the coaxial lines connected to the corresponding ends of the bolometer elements.

Furthermore, the bolometer elements are secured within the mount by means that permit their easy removal, and the mount is constructed so that the elements are readily accessible and may be replaced when necesary by the user.

The invention will be described by referring to the accompanying drawings wherein:

FIG. 4 is a longitudinal sectional view of a coaxial line waveguide embodiment of the present invention;

FIG. 5 is a transverse sectional view of the coaxial line device of FIG. 4, taken at section 5—5 of FIG. 4; and FIG. 6 is a partial sectional view taken at section 6—6 of FIG. 5.

Figure 1:
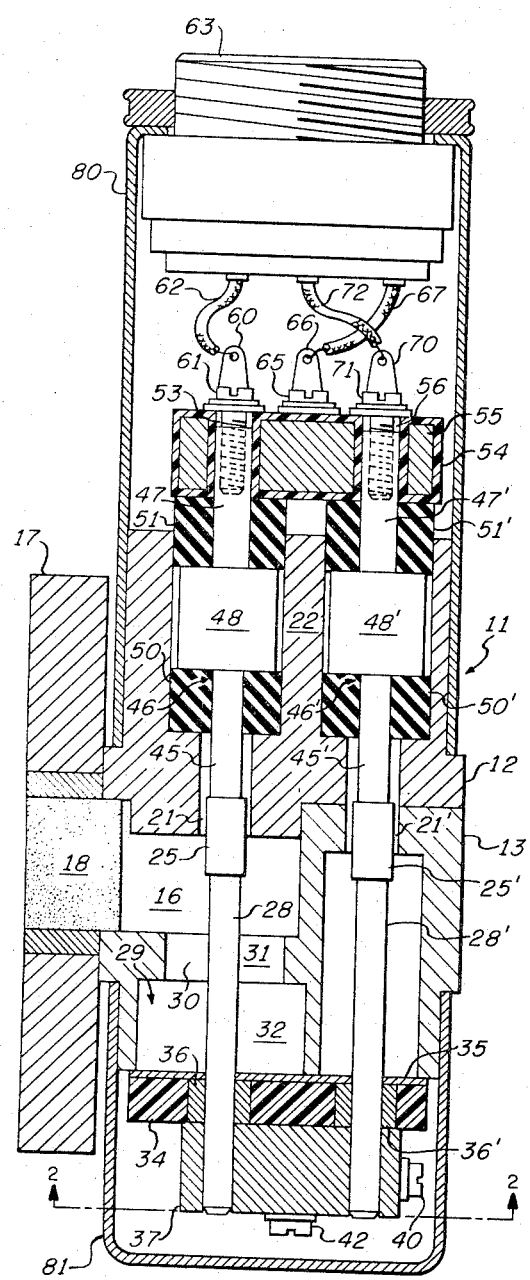
FIG. 1 is a vertical sectional view of a rectangular uniconductor waveguide bolometer mount of the present invention.

Referring now in detail to the drawings, the hollow waveguide dual element bolometer mount of this invention is illustrated in FIG. 1 and is comprised of a cylindrically shaped body member 11 that is formed of first and second body portions 12 and 13, each of which is of the same high thermal conductivity material such as copper, brass, or aluminum. Within body member 11 is formed a section of hollow rectangular uniconductor waveguide 16 which is dimensioned to freely propagate in the dominant $TE_{10}$ waveguide mode the electromagnetic waves whose power level is to be determined. Waveguide 16 is of reduced height over a portion of its length, and it is terminated at its right end by a conductive short circuit formed by body portion 13. The interior surface of waveguide 16 may be coated or plated with a high electrical conductivity material such as silver. A connecting flange 17 is positioned at the left end of waveguide 16 and is secured to body member 11. A solid plug of low loss dielectric material 18 is positioned at the input end of waveguide 16 to prevent dust particles and other foreign matter from entering the waveguide and to prevent radiant energy such as infra-red energy from impinging on the bolometer element and causing error. A circular aperture 21 extends through the top broad wall of waveguide 16 and extends upwardly through body portion 12, being of increased diameter in the region 22. An electromagnetic wave power sensing bolometer element 25, such as an encapsulated barretter wire or thermistor bead, for example, extends from aperture 21 into the waveguide 16 so that electromagnetic waves may be incident thereon. Encapsulated bolometer element 25 is circumferentially spaced from the walls of aperture 21 so that no direct thermal conduction path exists therebetween.

Bolometer element 25 is removably engaged at its lower end terminal by a supporting rod 28 of a material such as copper, brass, or aluminum that has high thermal and electrical conductivity. The engagement between the lower end terminal of bolometer element 25 and supporting rod 28 may be accomplished by means of mating threads, or by means of spring clips, depending upon the type of end terminals on bolometer element 25. Body portion 13 is machined to form the hollow cylindrical portion 29 and the cylindrical aperture 30 that extends through the bottom broad wall of waveguide 16. Supporting rod 28 extends through cylindrical aperture 30 and the hollow cylindrical portion 29 and forms therewith the center conductor of tandem coaxial line transformer sections 31 and 32 having outer conductors of different diameters. A disc 34 of a low thermal conductivity material, such as a plastic of the styrene family, encloses the end of body member 11. Disc 34 is plated with a very thin layer 35 of a high electrical conductivity material such as silver to provide an electrical short circuit termination for the coaxial line transformer section 32. This very thin plating of silver on disc 34 provides a negligible thermal conduction path between supporting rod 28 and the body member 11. An annular washer 36 of electrically conductive material is inserted within plastic disc 34 and securely engages supporting rod 28 to assure a good electrical short circuit at the end of coaxial transformer section 32. The electrical characteristics of coaxial line transformer sections 31 and 32 are chosen to provide proper matching of the bolometer element 25 and supporting rod 28 to the shorted hollow waveguide 16.

Figure 2:
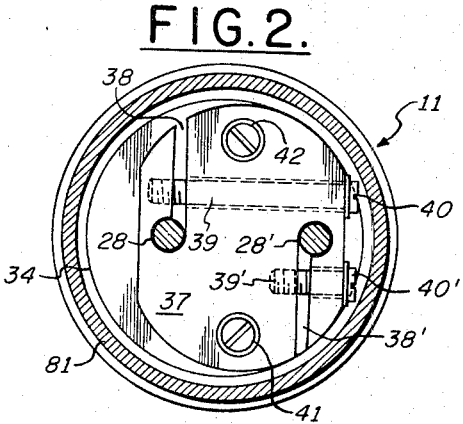
FIG. 2 is a transverse sectional view of the mount of FIG. 1, taken at section 2—2 of FIG. 1.

The bottom end of supporting rod 28 is secured within a solid bottom retaining disc 37 that is made of a high thermal conductivity material of the types previously named. As best seen in FIG. 2, two screws 41 and 42 of high thermal conductivity material secure bottom retaining disc 37 to body member 11 and provide direct thermal conduction paths therebetween.

The upper terminal of bolometer element 25 is removably engaged by means of mating threads or a spring clip to the lower end 45 of a center conductor 46 formed by said end 45, upper end 47, and a central portion 48 of enlarged diameter. Center conductor 46 is made of a high thermal and electrical conductivity material, and together with the cylindrical surface of the apertured region 22, forms a radio frequency filter or trap to block the leakage of electromagnetic waves from waveguide 16. Annular washers 50 and 51 of a thermal and electrical insulating material, support center conductor 46 and assure that the central portion 48 is circumferentially spaced from the cylindrical surface of apertured region 22, thereby assuring that no direct thermal or electrical conduction path exists therebetween.

The upper end 47 of center conductor 46 is engaged within a hole 53 in top retaining disc 55 that is made of a high thermal conductivity material which has a very thin coating 54 of electrical insulating material on all of its surfaces, including the surfaces of hole 53 and a similar hole 56. This arrangement permits good heat transfer between the end portion 47 of center conductor 46 and top retaining disc 55, while at the same time providing electrical insulation therebetween. Preferably, top retaining disc 55 is made of aluminum and its surfaces are anodized to provide a thin film of electrical insulation that does not seriously affect the desired heat transfer path.

An electrical terminal lug 60 is secured to the top portion 47 of center conductor 46 by means of a screw 61, and electrical connection is made by means of wire 62 to a pin in a conventional-type electrical connector plug 63. The electrical connections to the external bridge and metering circuit are made via connector plug 63. Thus, it may be seen that center conductor 46 is electrically connected to a pin in connector plug 63, while being electrically insulated from, but thermally coupled to, top retaining disc 55.

A thermally conductive screw 65, and a similar one behind it, but not illustrated in FIG. 1, function similarly to screws 41 and 42, FIG. 2, to provide direct thermal conduction paths between top retaining disc 55 and body member 11.

An electrical terminal lug 66 and conductor wire 67 provide an electrical ground connection between body member 11 and a pin in connector plug 63.

Also included within body member 11 is an ambient temperature sensing bolometer element 25' that is chosen to have resistance and temperature sensitivity characteristics that substantially match those of electromagnetic wave power sensing bolometer element 25. Pairs of substantially identical barretter wires and thermistor beads are available on the commercial market for use in the dual element bolometer of this invention. For example, specially selected matched pairs of thermistor elements are available from Sperry Microwave Electronics Company, Clearwater, Fla., under the designation of catalog number 38B10BM.

The physical and thermal arrangement of bolometer element 25' within body member 11 is substantially identical to that of element 25. As may be seen, the bottom terminal of element 25' is engaged by a lower supporting rod 28' of electrical and thermal conducting material, and the lower end of rod 28' passes through and makes contact with, the conductive annular washer 36' that is inserted within the plastic disc 34. Also, the lower end of supporting rod 28' is secured within the bottom retaining disc 37. Supporting rod 28' is electrically connected to body member 11 by means of the thin conductive coating 35 on plastic disc 34. To assure good thermal contact between the supporting rods 28 and 28' and bottom retaining disc 37, disc 37 is provided wtih the inwardly extending slots 38 and 38', FIG. 2, that communicate with the holes in disc 37 through which pass the rods 28 and 28'. The holes 39 and 39' extend transversely through the respective slotted regions and are threaded at the inward ends to receive the clamping screws 40 and 40'. By tightening the screws 40 and 40', the portions of bottom retaining disc 37 that surround the rods 28 and 28' are drawn in tightly around said rods to assure a firm thermal contact therebetween.

The upper terminal of bolometer element 25' is releasably engaged by conductor 46' which is comprised of the end portions 45' and 47', and the central portion 48' of enlarged diameter. The top of end portion 47' passes through the hole 56 in top retaining disc 55 and is electrically insulated therefrom by the anodized insulating coating thereon, but is thermally coupled thereto, for the same reasons previously described for the top portion 47 of center conductor 46.

Insulating washers 50' and 51' support center conductor 46' in circumferentially spaced relationship from body portion 12.

A terminal lug 70 is secured by means of a screw 71 to the top of center conductor 46', and a wire 72 makes electrical connection to a pin in connector plug 63, by which electrical connection is made to the external circuit.

It will be seen that the ambient temperature sensing bolometer element 25' extends within, but is circumferentially spaced from, the walls of an aperture 21' in body portion 13 in an identical manner to the position of power sensing bolometer element 25 relative to aperture 21 in body portion 12. While the supporting rod 28' does not have the identical physical relationship to the surrounding body portion 13 that supporting rod 28 has to its surrounding body portion 12, the thermal relationships are substantially identical. This results from the fact that the heat transfer by radiation is an inverse function of distance squared, so that the slight difference in physical structure will result in a negligible thermal difference.

The structural elements and features having corresponding primed and unprimed numerals are made of the same material so as to establish substantial thermal symmetry with respect to the bolometer elements 25 and 25' and the remainder of the mount structure.

Top and bottom cylindrical housing member 80 and 81 enclose body member 11 and provide an outer housing for the mount.

Figure 3:
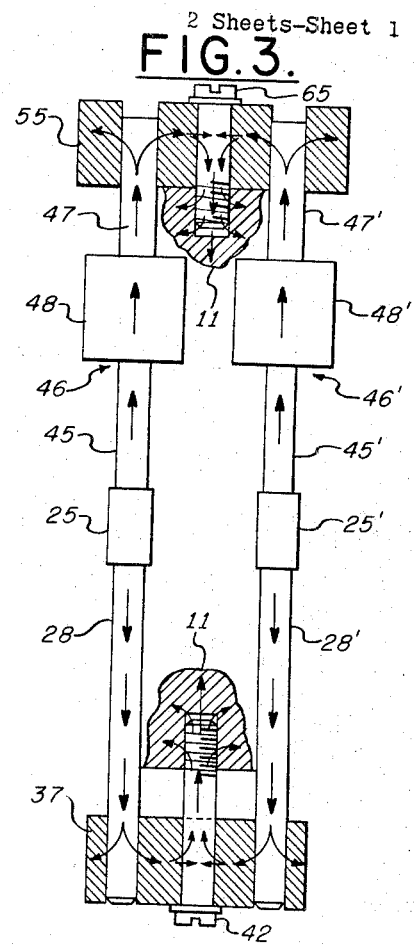
FIG. 3 is a view of a portion of the mount of FIG. 1 that shows only the direct thermal conduction paths associated with the bolometer elements and the body of the mount.

A change in ambient temperature will cause the resistance of power sensing bolometer element 25 to change. In order for the ambient temperature sensing bolometer 25' to produce an accurate compensation in the meter reading, the two bolometer elements must be in the same ambient temperature environment, and any ambient temperature changes must be the same at both elements. The manner in which these desirable results are achieved in the dual mount of this invention are best seen by referring to FIGS. 3 and 2. FIG. 3 illustrates only the direct thermal conduction paths associated with elements 25 and 25'. As previously described, all components illustrated are made of high thermal conductivity material, so that any temperature differential between the two bolometer elements 25 and 25' will be readily and quickly equalized by heat transfer through the upper direct thermal conductive path consisting of center conductors 46, 46' and upper retaining disc 55, and through the lower direct thermal conductive path consisting of supporting rods 28, 28' and lower retaining disc 37. Further, should a temperature change occur in the external environment of the dual element mount, this heat input or loss will first affect the body member 11, FIG. 2, and because it is of a high thermal conductivity material, any temperature gradient will be quickly dissipated throughout the entire volume of the body member 11. As seen in FIG. 3, direct thermal connection is made from body member 11 to screws 41 and 42 (screw 41 not illustrated) to the bottom retaining disc 37, and to screws 65 and the one associated therewith to the upper retaining disc 55. It is seen that the thermal paths between bottom retaining disc 37 and bolometer elements 25 and 25' are equal and symmetrical, i.e., support rods 28 and 28' are of equal length and symmetrically positioned relative to the screws 41 and 42. The thermal paths between top retaining disc 55 and bolometer elements 25 and 25' also are equal and symmetrical, i.e., conductors 46 and 46' are of equal length and symmetrically positioned relative to the top screws. Therefore, the elements 25 and 25' are directly thermally coupled to body member 11 by two symmetrical shunt thermal paths so that temperature equilibrium will be maintained between the bolometer elements as heat is gained from or lost to the body member 11.

Considering now heat gained or lost by radiation between the bolometer elements themselves and body member 11, and between the direct thermal paths and body member 11, reference to FIG. 1 shows that the relationship of center conductor 46, bolometer element 25, and supporting element 26 to the surrounding body member 11 is substantially identical to the relationship of center conductor 46', bolometer element 25', and supporting rod 28 to body member 11. Therefore, any heat transfer to or from body member 11 affect bolometer elements 25 and 25' substantially identically because of the identity of the radiation paths. The differences in the separations of supporting rods 28 and 28' from the surrounding body member 11, as illustrated in FIG. 2, will have negligible effect to disturb the symmetry of the radiation paths because any temperature changes will be small, and the radiated heat is an inverse function of distance squared.

Should it become necessary, the user of the uniconductor waveguide dual element bolometer mount may replace the bolometer elements 25 and 25' by another matched pair by the following procedure. The cylindrical housing member 81, which is secured to body member 11 by means of screws not illustrated, is removed, as is the top cylindrical housing member 80. Next, the screw 65 that extends through upper retaining disc 55, and a similar one behind it, but not illustrated, are removed from engagement with body member 11. The clamping screws 40, 40′ are removed, and the screws 41 and 42 that extend through bottom retaining disc 37 also are removed from engagement with body member 11. Bottom retaining disc 37 now may be removed, and that portion of the mount illustrated in FIG. 3, except for bottom retaining disc 37, may be removed by withdrawing it from the top end of the mount. Bolometer elements 25 and 25′ now are accessible for replacement.

It is not necessary that body member 11 be made of the separately machined portions 12 and 13. If desired, the body member 11 may be cast as a single member.

A coaxial line waveguide embodiment of the dual element bolometer mount of this invention is illustrated in FIGS. 4–6. In FIG. 4, the outer housing of the mount is comprised of a plastic cylindrical member 101 and a metallic cylindrical member 102 that enclose the mount in an electrically shielded housing. Additionally, members 101 and 102 serve to prevent dust and other foreign matter from entering the mount. A section of coaxial line waveguide 103 extends axially within the mount. The left end of coaxial line section 103 is provided with a coaxial line coupler comprised of coupling nut 104 and the outer and inner conductors 106 and 107, respectively, of the coaxial line section. A dielectric moisture-seal washer 108 is provided at the base of the connector and is secured to the shoulder 109 formed at the inner end of outer conductor 106. A bead 110 of a low loss dielectric material extends between the conductors of coaxial line section 103 and concentrically supports the inner conductor 107. A dielectric pin 111 extends transversely through bead 110 and inner conductor 107 and is supported within a body member 114 to maintain bead 110 in its desired position. Annular shaped body member 114 is in direct electrical and thermal contact with the shoulder portion 109 of outer conductor 106, thereby serving as a continuation of the outer conductor of the coaxial line. Because body member 114 is in direct thermal contact with outer conductor 106 of the coaxial line, it therefore will be in direct thermal contact with the external environment. Positioned to the right of body member 114 is an annular shaped spacer member 116 that is made of a plastic or dielectric material that is a poor thermal conductor. However, to insure continuity of the outer conductor of coaxial line section 103 spacer member 116 is plated or coated at least on its inner surface with a thin layer of an electrically conductive material so as to provide the necessary electrical conductivity, but without substantially affecting the thermal isolation provided thereby. Spacer member 116 is secured to body member 114 by means of screws 117 and 118 which extend through said members.

Left contact disc 120 is positioned to the right of spacer member 116 and is spaced therefrom by means of an annular shaped R.F. capacitor 121. Left support member 120 is made of a high thermal and electrical conductive material and its inner surface serves as a continuation of the outer conductor or coaxial line section 103.

To the right of support member 120 is an annular shaped supporting member 124 of a high thermal and electrical conductive material. Secured to the two faces of supporting member 124, respectively, are the bolometer disc assemblies 125 and 126, each of these disc assemblies being of the type disclosed in U.S. Patent 3,098,984, issued July 23, 1963, in the name of Howard L. Martin and assigned to applicant's assignee. Bolometer disc assembly 125 is supported and maintained in proper registration with left support member 120 and mounting disc 124 by means of small pins 130 and 131 which fit within respective holes of said members 120 and 124. The holes 132 and 133 in mounting disc 124 are provided with an electrical insulating coating so as to prevent electrical contact between the left contact disc 120 and the mounting disc 124 except through the bolometer disc assembly 125. A similar arrangement supports disc assembly 126.

The center conductor 107 of coaxial line section 103 is broken in its central region by the dielectric tube 135 and dielectric washer 136 which together form an R.F. coupling capacitor. The right end of center conductor 107 is in contact with the bolometer disc assembly 125 to provide R.F. electrical connection to the bolometer disc assembly in the same manner as taught in the above-cited Patent 3,098,984.

A short cylindrical rod 138 of a thermal and electrical insulating material is positioned within the central aperture of mounting disc 124 and extends between the central regions of bolometer disc assembly 125 and 126 to provide mechanical support for said disc assemblies.

Annular mounting disc 124 is electrically grounded and thereby provides a short circuit termination for coaxial line section 103. Each of the bolometer disc assemblies 125 and 126 is comprised of two thin discs or wafers of dielectric material, each disc having conductive surfaces and a bolometer element mounted thereon in such a manner that when the discs were secured together face-to-face and inserted in the coaxial line, the elements are in parallel with the R.F. electrical circuit, but in series connection with the external bridge circuit. As taught in said U.S. Patent 3,098,984, bolometer disc assembly 125 is constructed to provide the desired matching characteristics so as to match the disc assembly to the coaxial line waveguide 103. Bolometer disc assembly 126 is not in the path of electromagnetic waves and will not absorb energy therefrom. As a result, the resistance of the bolometer elements mounted on bolometer disc assembly 126 will be a function only of the ambient temperature, and as will be explained in more detail hereinafter, the construction of the mount of this invention assures substantial equal ambient temperatures at both the bolometer disc assemblies 125 and 126.

A right contact disc 140 is in contact with the right side of bolometer disc assembly 126, and a short cylinder 141 of a thermally conductive material is secured within the central aperture 142 and provides physical support for the bolometer disc assembly 126. The short cylinder 141 of thermally conductive material provides a heat transfer path to the center of bolometer disc assembly 126 that simulates the path to the center of bolometer disc assembly 125 that is provided by the end of center conductor 107. Short cylinder 141 may be made of beryllium oxide, which is a thermal conductor, but an electrical insulator.

The annular shaped capacitor disc 121 between spacer member 116 and left contact disc 120, and the R.F. coupling capacitor formed by the dielectric tube 135 and dielectric washer 136 provide respective D.C. blocking means in the outer and inner conductors of coaxial line section 103 thereby to isolate the power measuring bridge circuit from the R.F. circuit at the left end of coaxial line section 103.

As illustrated in FIG. 6, longitudinally-extending screws 150 and 151 of a high thermal conductive material extend between annular mounting disc 124 and body member 114 to provide direct thermal conductive paths therebetween. Annular spacer member 116 and left contact disc 120 have enlarged holes in registration with the screws 150 and 151 which permit said screws to pass therethrough without making contact, thereby avoiding direct thermal and electrical contact with annular mounting disc 124. The bolometer disc assembly 125 will not provide direct thermal contact between left contact disc 120 and annular mounting disc 124, since the dielectric discs on which the bolometer elements are mounted form effective thermal insulators therebetween. Similarly, the bolometer disc assembly 126 prevents direct thermal contact between annular mounting disc 126 and right contact disc 140. Also, the dielectric spacing member 116 prevents direct thermal contact with the body member 114 and the remainder of the mount disposed to the right of spacer member 116. By means of the arrangement just described, a direct thermal conductive path between bolometer disc assemblies 125 and 126 is provided solely by annular mounting disc 124. Furthermore, the longitudinally-extending screws 150 and 151 provide the only direct thermal conduction paths between the bolometer disc assemblies 125 and 126 (via annular mounting disc 124) to the body member 114, and thus to the outside environment. Because annular mounting disc 124 is a symmetrical figure of revolution, and because screws 150 and 151 are symmetrically positioned about the center axis of annular mounting disc 126, said screws provide substantially equal and symmetrical direct thermal conduction paths from the bolometer elements on bolometer disc assemblies 125 and 126 to the external environment. Therefore, any temperature change in the external environment will cause substantially equal heat transfer to or from bolometer disc assemblies 125 and 126 via screws 150, 151, and annular mounting disc 124. The dielectric spacer member 116 prevents the direct transfer of heat to or from the bolometer disc assemblies 125 and 126, thereby preventing any outside temperature change from reaching disc assembly 125 before it reaches disc assembly 126.

In comparing the thermal features just described for the coaxial line embodiment with those of the uniconductor waveguide embodiment previously described, it may be seen that annular mounting disc 124 and parallel screws 150 and 151, FIG. 6, provide the direct thermal conductive connection between the bolometers themselves, and between the bolometers and body member 114, just as is done in the device of FIGS. 1–3 by the supporting rods 28 and 28′, bottom retaining disc 37 and screw 42, and by the center conductors 46, 46′, top retaining disc 55 and screw 65.

The electrical connections from the bolometer disc assemblies to the external bridge and metering circuit are made through pins in a standard connector plug 160, FIG. 4. A conductor wire 162 from a pin in connector plug 160 is secured to a lug 163 on a screw 164. Screw 164 passes through an insulator washer 165 and is engaged by a threaded hole in annular mounting disc 124. This electrical connection just described will be connected to the ground terminal of the external bridge circuit, and by means of electrical contact established between annular mounting disc 124 and the appropriate contacting surface on bolometer disc assemblies 125 and 126, one end of the series connected bolometer elements on each disc assembly is thereby grounded. The other end of the series connected bolometer elements on bolometer disc assembly 125 will be connected in the meter circuit through left contact disc 120, screw 173, wire conductor 174 and a pin on connector plug 160. The dielectric washer 175 in right contact disc 140 and the enlarged non-contacting hole 176 in annular mounting disc 124 prevent electrical contact between screw 173 and said discs 124 and 140.

The ambient temperature sensing bolometer elements on bolometer disc assembly 126 are directly coupled to the external metering circuit through right contact disc 140 and screw 178, conductor wire 180, and a pin of connector plug 160.

One of the advantageous features of the coaxial line bolometer mount illustrated in FIG. 4 is that the bolometer disc assemblies 125 and 126 may be readily removed in the field by the user and replaced by respective pairs of matched bolometers so as to assure desired zero stability, with varying temperature, of the metering circuit without any further effort. The bolometer disc assemblies may be removed from the mount by the following procedure. First referring to FIG. 4, the securing nut 182 of connector plug 160 is unscrewed, as are the set screws 183 and 183′ in housing member 102. Housing member 102 now may be removed by sliding it to the right over the end of connector plug 160. The removal of screws 164 and 173 will permit the removal of right contact disc 140, thus providing access to bolometer disc assembly 126. Next, screws 150 and 151, FIG. 6, are removed, thereby releasing the annular mounting plate 124 and bolometer disc assembly 125. The replacement and reassembly of the mount is the reverse of the procedure just described.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A dual element bolometer mount for coaxial line waveguide comprising,
    a section of coaxial line waveguide having inner and outer conductors,
    a coaxial line connector at one end of said waveguide,
    a first annular shaped thermal and electrical conductive member in direct thermal and electrical conductive contact with said connector and forming a portion of the outer conductor of said waveguide,
    a second thermal and electrical conductive member axially spaced from said first member and adapted to terminate said waveguide,
    means intermediate said two conductive members for providing electrical continuity of the outer conductor of the waveguide therebetween and for thermally insulating said two conductive members from each other,
    first and second bolometer means disposed on opposite sides of said second conductive member and in thermal and electrical contact therewith,
    only said first bolometer means being in the path of electromagnetic wave within said waveguide, and
    longitudinally-extending thermal conductors extending between said first and second conductive members for providing direct thermal conduction paths between said bolometer means and said first conductive members.

2. A coaxial line bolometer mount for housing a pair of bolometer element mounting means, said mount comprising,
    a section of coaxial line waveguide having a connector means at one end and being terminated at its other end,
    a solid thermally and electrically conductive member at said one end of said coaxial line forming at least a portion of the outer conductor thereof,
    a first bolometer element mounting means disposed within said coaxial line in the path of electromagnetic waves supported therein,
    an annular-shaped thermally conductive member disposed coaxially within said mount on the side of said first bolometer element opposite said one end of said coaxial line,
    a second bolometer element mounting means disposed on the side of said annular-shaped member opposite said first mounting means,
    said annular-shaped member being in direct thermal contact with both said mounting means to provide a direct thermal conduction path therebetween, and thermal conductive means extending between said solid conductive member and said annular-shaped member for providing a direct thermal conduction path therebetween.

3. A coaxial line bolometer mount for housing a pair of bolometer element mounting means, said mount comprising,
    a section of coaxial line waveguide having a connector means at one end and being terminated at its other end,
    a solid thermally and electrically conductive member at said one end of said coaxial line forming at least a portion of the outer conductor thereof, a first bolometer element mounting means disposed within said coaxial line in the path of electromagnetic waves supported therein, an annular-shaped thermally conductive member disposed coaxially within said mount on the side of said first bolometer element opposite said one end of said coaxial line, a second bolometer element mounting means disposed on the side of said annular-shaped member opposite said first mounting means, said annular-shaped member being in direct thermal contact with both said mounting means to provide a direct thermal conduction path therebetween, and longitudinally-extending thermal conductors in direct thermal contact with said solid conductive member and said annular-shaped member to provide direct thermal conduction paths therebetween, said longitudinally-extending thermal conductors being symmetrically positioned about the axis of said coaxial line to provide substantially equal heat transfer paths between said bolometer element mounting means and said solid conductive member.

4. A rectangular waveguide dual element bolometer mount comprising, a solid body member of a high thermal conductvity material, a rectangular waveguide section having broad and narrow walls formed in said body member intermediate its two ends, first and second substantially identical and parallel apertures extending into the interior of said body member from one end thereof, a first one of said apertures extending through one broad wall of said waveguide and the second one of said apertures being positioned so as not in intersect said waveguide, first and second bolometer elements disposed within said body member, the first one of said bolometer elements being positioned in registration with said first apertures and disposed within said waveguide in the path of electromagnetic waves supported therein, the second one of said bolometer elements being disposed outside of said waveguide and positioned relative to said second aperture in a manner substantially identical to the relative positions of the first bolometer element and first aperture, first and second center conductors respectively disposed in spaced coaxial relationship within said first and second apertures, each center conductor having one end in direct thermal and electrical conductive contact with a respective bolometer element, means at the other ends of said center conductors for providing symmetrical direct thermal conduction paths between said center conductors and said body member, said last named means including means for electrically insulating said center conductors to provide separate electrical conduction paths to said bolometer elements.

5. A hollow waveguide bolometer mount for housing a plurality of bolometer elements and for maintaining substantial thermal equilibrium between said elements, said mount comprising, a section of rectangular uniconductor waveguide open at one end and terminated at its opposite end, a body member of high thermal conductivity material extending beyond the walls and terminated end of said waveguide, a first section of coaxial line waveguide extending through said body member and transversely through the broad walls of said uniconductor waveguide, the outer conductor of said coaxial line waveguide being in conductive thermal contact with said body member, an electromagnetic wave power sensing bolometer element positioned within said uniconductor waveguide and thermally and electrically connected in direct serial relationship in the center conductor of said coaxial line, a second section of coaxial line waveguide extending through said body member parallel to said first coaxial line and in the region of said body member beyond the terminated end of the uniconductor waveguide, an ambient temperature sensing bolometer element disposed within said body member and thermally and electrically connected in direct serial relationship in the center conductor of the second coaxial line waveguide, means at one end of said body member for establishing a direct thermal conductive connection between the center conductors of said coaxial lines and for establishing direct and symmetrical thermal and electrical conductive connections between said center conductors and said body member, means at the other end of said body member for establishing substantially a direct thermal conductive connection between said center conductors and for establishing direct and symmetrical thermal conductive connections between said center conductors and said body member, said last-named means also providing electrical isolation of said center conductors from each other and from said body member, and means for providing external electrical connections to each of said center conductors.

6. A hollow waveguide multiple element bolometer mount comprising, a body member of high thermal conductivity material, a section of waveguide adapted to support electromagnetic waves formed within said body member and terminating therein in a short circuit, at least two bolometer elements located within said body member with one of said elements in the path of electromagnetic waves supported in said waveguide, a first pair of axially aligned coaxial transmission line structures extending through said body member transversely to said waveguide, each of said coaxial line structures having one end of its center conductor in direct electrical and thermal contact with a respective terminal of said one bolometer element and the other end of each center conductor extending outwardly beyond a respective end of said body member, a second pair of axially aligned coaxial transmission line structures substantially identical to said first pair extending through said body member parallel to said first pair, each of said coaxial line structures of said second pair having one end of its center conductor in direct electrical and thermal contact with a respective terminal of the other bolometer element and the other end of each center conductor extending outwardly beyond a respective end of said body member, means at one end of said body member for electrically short circuiting the two coaxial line structures present at said end and for providing thermally symmetrical high conductivity heat paths between said body member and the respective center conductors extending beyond said one end, means at the other end of said body member for providing thermally symmetrical high conductivity heat paths between said body member and the respective center conductors extending beyond said other end, said last named means also providing electrical insulation about the respective center conductors extending beyond said other end of the body member, and means for providing electrical connections to said insulated center conductors, whereby electrical connections may be made from said bolometer elements to circuit external to said mount.

7. A hollow waveguide dual element bolometer mount comprising the combination,
   a solid body member of high thermal conductivity material,
   a hollow rectangular waveguide formed within said solid body member and adapted to support electromagnetic waves having a transverse electric field component,
   said waveguide terminating within said body member,
   first and second coaxially aligned apertures extending transversely through said body member and respectively intersecting said waveguide through opposite broad walls,
   a first bolometer element positioned within said waveguide in registration with said apertures,
   first and second rods of high thermal and electrical conductivity material of smaller diameter than said apertures respectively positioned coaxially within said apertures and connected to said bolometer element at one of their ends and extending outwardly beyond said body member at their opposite ends,
   third and fourth coaxially aligned apertures extending transversely through said body member parallel to said first two apertures,
   said third and fourth apertures intersecting each other externally of the boundaries of said waveguide,
   a second bolometer element positioned intermediate the ends of said third and fourth apertures in a position corresponding to the position of said first bolometer element between said first and second apertures,
   third and fourth rods of high thermal and electrical conductivity material of smaller diameter than said third and fourth apertures respectively positioned coaxialy within said third and fourth apertures and connected to said second bolometer element at one of their ends and extending outwardly beyond said body member at their other ends,
   means at one end of said body member for providing electrical short circuits between said first and third rods and said body member and for providing a high thermal conductivity heat path between the outwardly extending ends of said first and third rods,
   means at the opposite end of said body member for providing a high thermal conductivity heat path between the outwardly extending ends of said second and fourth rods and for electrically insulating said second and fourth rods from each other and from said body member, and
   means at each of said ends of said body member for providing respective direct high thermal conductivity heat paths between said body member and the respective means that provide heat paths between the outwardly extending ends of the respective pairs of rods.

8. A hollow waveguide dual element bolometer mount comprising,
   a body member of high thermal conductivity material,
   a section of hollow rectangular waveguide extending into said body member intermediate its two ends and terminating in a conductive wall within said body member,
   first and second apertures respectively extending transversely through opposite ends of said body member and communicating with said waveguide through opposite broad walls thereof,
   a first bolometer element positioned within said waveguide in the path of electromagnetic waves supported therein,
   first and second center conductors respectively disposed coaxially within said first and second apertures to form coaxial transmission lines with the walls of said apertures,
   one end of each of said center conductors being in thermal and electrical contact with respective terminals of said bolometer element and the other ends of said center conductors extending outwardly beyond the respective ends of said body member,
   third and fourth axially aligned apertures substantially parallel to and identical, respectively, to said first and second apertures and extending transversely through opposite ends of said body member in the region beyond said conductive wall of said waveguide,
   said third aperture extending upwardly from the bottom end of said body member beyond the end of the bottom wall of said waveguide and intersecting said fourth aperture in the region beyond the end of the top wall of said waveguide,
   a second bolometer element positioned within said third aperture in a manner substantially identical to the position of said first bolometer element in said waveguide,
   third and fourth center conductors substantially identical, respectively, to said first and second center conductors disposed coaxially within said third and fourth apertures and each having one end in thermal and electrical contact with the second bolometer and each having their opposite ends extending outwardly beyond the respective ends of said body member,
   a first thermally conductive disc disposed adjacent one end of said body member and having two symmetrically positioned holes therein for receiving said first and third center conductors,
   a second thermally conductive disc disposed adjacent the opposite end of said body member and having two symmetrically positioned holes therein for receiving said second and fourth center conductors,
   electrical insulating means disposed within the holes of said second disc member to electrically insulate said disc member from said second and fourth center conductors but to provide negligible impedance to heat flow therebetween,
   and means for providing external electrical connections to said second and fourth center conductors.

References Cited
UNITED STATES PATENTS

| | | | |
|---|---|---|---|
| 2,799,826 | 7/1957 | Eberle | 324—95 |
| 3,237,101 | 2/1966 | Vaughan | 324—95 |

ARCHIE R. BORCHELT, *Primary Examiner.*

WALTER L. CARLSON, *Examiner.*

E. F. KARLSEN, *Assistant Examiner.*